US008949285B2

(12) United States Patent
Kumar

(10) Patent No.: US 8,949,285 B2
(45) Date of Patent: Feb. 3, 2015

(54) SYSTEMS AND METHODS FOR HANDLING PERFORMANCE MONITORING DATA

(75) Inventor: Vikas Kumar, New Delhi (IN)

(73) Assignee: Ciena Corporation, Hanover, MD (US)

(*) Notice: Subject to any disclaimer, the term of this patent is extended or adjusted under 35 U.S.C. 154(b) by 512 days.

(21) Appl. No.: 12/268,678

(22) Filed: Nov. 11, 2008

(65) Prior Publication Data
US 2010/0082632 A1 Apr. 1, 2010

(51) Int. Cl.
G06F 17/30 (2006.01)
H04L 12/24 (2006.01)

(52) U.S. Cl.
CPC ...... H04L 41/5009 (2013.01); G06F 17/30292 (2013.01); H04L 41/5003 (2013.01)
USPC .......................................................... 707/803

(58) Field of Classification Search
USPC .......................... 707/661, 649, 792, 802, 803
IPC ......... G06F 17/30, 17/30292, 17/30289, 17/302, G06F 11/30, 1/3209
See application file for complete search history.

(56) References Cited

U.S. PATENT DOCUMENTS 6,161,144 A * 12/2000 Michels et al. ............... 709/238
6,477,288 B1 * 11/2002 Sato ............................... 385/16
6,563,793 B1 * 5/2003 Golden et al. ................. 370/236
6,912,221 B1 * 6/2005 Zadikian et al. .......... 370/395.21
7,441,018 B1 * 10/2008 Shafer et al. .................. 709/220
7,577,099 B1 * 8/2009 Greenberg et al. ........... 370/242
7,752,301 B1 * 7/2010 Maiocco et al. .............. 709/224
2003/0023516 A1 * 1/2003 Sharrow et al. ................. 705/28
2003/0140308 A1 * 7/2003 Murthy et al. ................ 715/500
2004/0170173 A1 * 9/2004 Pan et al. ....................... 370/392
2007/0004394 A1 * 1/2007 Chu et al. .................... 455/422.1
2007/0081464 A1 * 4/2007 Miriyala et al. .............. 370/241
2007/0208723 A1 * 9/2007 Peterson et al. .................. 707/4
2008/0052401 A1 * 2/2008 Bugenhagen et al. ........ 709/227
2008/0201105 A1 * 8/2008 Hermsmeyer et al. ........ 702/182
2009/0226164 A1 * 9/2009 Mayo et al. ..................... 398/25

* cited by examiner

Primary Examiner — James Trujillo
Assistant Examiner — Fatima Mina
(74) Attorney, Agent, or Firm — Clements Bernard PLLC; Christopher L. Bernard; Lawerence A. Baratta, Jr.

(57) ABSTRACT

The present disclosure provides systems and methods for handling performance monitoring (PM) data in a database in a manner that supports different PM data sets from different network element (NE) device types in an integrated manner. The present invention defines a single database structure that can be utilized to store, handle, retrieve, etc. PM counters from multiple NEs including NEs of different types, e.g. SONET/SDH NE, DWDM NE, optical switch, Ethernet switch, etc. The single database enables an efficient mechanism to handle PM data in a uniform way across a network with different device types.

11 Claims, 7 Drawing Sheets

SYSTEMS AND METHODS FOR HANDLING PERFORMANCE MONITORING DATA

CROSS-REFERENCE TO RELATED APPLICATION(S)

The present non-provisional patent claims the benefit of priority of co-pending Indian Patent Application No. 2196/DEL/2008, filed on Sep. 19, 2008, and entitled "SYSTEMS AND METHODS FOR HANDLING PERFORMANCE MONITORING DATA," the contents of which are incorporated in full by reference herein.

FIELD OF THE INVENTION

The present invention relates generally to performance monitoring in communication networks. More particularly, the present invention provides systems and methods for handling performance monitoring (PM) data in a database in a manner that supports different PM data sets from different network element (NE) types in an integrated manner.

BACKGROUND OF THE INVENTION

In networks, monitoring the performance of a communication system is part of a proactive strategy that can identify problems before service is affected. Various telecom and data related protocols, such as SONET, SDH, Optical Transport Network (OTN), Carrier Ethernet (IEEE 802.1ag, and related ITU-T standard Y.1731), and the like, implement various different measurements of performance. Typically, PM counter values are included in overhead of the various telecom and data related protocols with each network element (NE) processing and updating these values. Advantageously, PM data, i.e. PM counter values over time for a variety of metrics, provides network operators various statistics related to network performance for proactive identification of problems, maintenance of service layer agreements (SLAs) with end users, troubleshooting, and the like.

Network operators can access PM data through a network management system (NMS), element management system (EMS), craft interface (CI), and the like. Communication systems generally include multiple interconnected network elements (NEs) in a network to offer various communication services between the NEs and end users. The NEs can include a system processor with a storage element to maintain PM data for provisioned channels. Additionally, the NEs can communicate with the NMS, EMS, CT, or the like to periodically provide the PM data. Conventional systems typically maintain a database of historical PM data from various NEs in the communication system, and the PM data is stored in separate tables for different NE device types. As discussed herein, PM data generally includes a set of counter values for different PM statistics based on the specific protocol.

SONET/SDH generally includes a layered network structure including section, line, and path, and corresponding section terminating equipment (STE), line terminating equipment (LTE), and path terminating equipment (PTE). Each of the equipment provides termination of associated SONET/SDH overhead and corresponding processing of section, line, and path PM data. Exemplary SONET PM data includes coding violations (CV-S, CV-L, CV-P), errored seconds (ES-S, ES-L, ES-P), severely errored seconds (SES-S, SES-L, SES-P), severely errored frame seconds (SEFS-S, SEFS-L, SEFS-P), unavailable seconds (UAS-S, UAS-L, UAS-P), failure counts (FC-S, FC-L, FC-P), and the like.

OTN generally includes a layered network structure including section (Optical Transport Unit—OTU) and path (Optical Data Unit—ODU), and corresponding OTU and ODU termination equipment. Advantageously, OTN offers strong forward error correction (FEC), full transparency of client signals, switching scalability, and the like. Exemplary OTN PM data includes trail trace identifier (TTI), backward defect identifier (BDI), incoming alignment error (IAE), FEC related counts, and the like.

Carrier Ethernet defined in standard IEEE 802.1ag and IEEE 802.3ah, for example, provides Operations, Administration, and Maintenance (OAM) capabilities allowing connectivity verification, rapid recovery, and performance measurement. These and other techniques are being developed and standardized to introduce PM data to Ethernet signals to enable carrier-grade performance of Ethernet similar to SONET/SDH and OTN.

Referring to FIG. 1, a diagram illustrates a convention mechanism 100 for handling historical PM data. An NE 102 continuously generates PM data 104 for provisioned connections on the NE 102. The NE 102 provides the PM data 104 (e.g., SONET PMs including ES-P, SES-P, etc.) to a server 106, such as a NMS, EMS, or the like. A mediator 108 is configured to directly insert the PM data 104 into a database 110. For example, the mediator 108 can operate on the server 106. Load balancing can be achieved by invoking a separate virtual machine (VM) in the server 106 for PM data 104 collection. The PM data 104 is conventionally modeled specifically to device type of the NE 102, e.g. SONET/SDH, OTN, Ethernet, dense wave division multiplexed (DWDM), etc. For example, the database 110 includes a specific table 112 or the like for each different device type, e.g. SONET PM data is kept in a separate database 110 or separate table 112 from another device type, such as an Ethernet switch. Disadvantageously, different sets of PM data 104 parameters from different device creates a major challenge on the scalability and performance as PM parameters grow for all device types.

BRIEF SUMMARY OF THE INVENTION

In various exemplary embodiments, the present invention provides systems and methods for handling performance monitoring (PM) data in a database in a manner that supports different PM data sets from different network element (NE) device types in an integrated manner. The present invention defines a single database structure that can be utilized to store, handle, retrieve, etc. PM counters from multiple NEs including NEs of different device types, e.g. SONET/SDH NE, DWDM NE, optical switch, Ethernet switch, etc. The single database enables an efficient mechanism to handle PM data in a uniform way across a network with different device types.

In an exemplary embodiment of the present invention, a method for handling historical performance monitoring data includes receiving a set of performance monitoring counters from a network element including a device type of a plurality of device types; creating a new record in a database; filling in common columns in the new record; mapping the set of performance monitoring counters to generic columns in the database responsive to the device type; and storing the new record. The method can further include receiving a request for performance monitoring information; accessing the database to retrieve a record in the database responsive to the request; creating a logical view from the record responsive a device type of the record; mapping columns in the record to performance monitoring counters; and presenting the performance monitoring columns. The new record includes a set of common columns and a set of generic columns. Optionally, the common columns include a timestamp, a network element device type, and a network element identification; and the set of common columns is the same for each of the plurality of device types. The set of generic columns includes a quantity of columns sufficient to store a number of performance monitoring counters for each of the plurality of device types. The mapping the set of performance monitoring counters to generic columns includes utilizing a database schema for mapping columns responsive to the device type of the plurality of device types into a logical view from the record. The database schema can include one of schema definitions for logical views which define respective mappings for each device type of the plurality of device types and an extensible mark-up language file for each device type of the plurality of device types. Optionally, the plurality of device types includes a wavelength division multiplexing system, an optical switch, an Ethernet switch, and a SONET/SDH network element.

In another exemplary embodiment of the present invention, a database for handling historical performance monitoring data includes a data store; and a database stored in the data store, wherein the database includes a plurality of records, and wherein each of the plurality of records includes: a set of common columns; and a set of generic columns, wherein each column in the set of generic columns is defined responsive to a device type of a plurality of device types; and wherein performance monitoring counters for the plurality of device types are stored in the database. Optionally, the set of common columns include a timestamp, a network element device type, and a network element identification; and the set of common columns is the same for each of the plurality of device types. The set of generic columns include a quantity of columns sufficient to store a number of performance monitoring counters for each of the plurality of device types. The performance monitoring counters for a specific device type of the plurality of device types are mapped to the set of generic columns utilizing a database schema for mapping columns responsive to the device type of the plurality of device types into a logical view. The database schema can include an extensible mark-up language file for each device type of the plurality of device types. Optionally, the plurality of device types includes a wavelength division multiplexing system, an optical switch, an Ethernet switch, and a SONET/SDH network element. A new device type is added to the plurality of device types in the database by defining a new extensible mark-up language file for the new device type.

In yet another exemplary embodiment of the present invention, a management system includes a data store; memory; a network interface configured to receive performance monitoring counters from a plurality of devices, wherein each of the plurality of devices includes one of a plurality of device types; input/output interfaces; a processor; wherein each of the processor, the data store, the memory, the network interface, and the input/output interfaces are communicatively coupled; a mechanism to map received performance monitoring counters to a database in the data store responsive to a device type of the plurality of device types; and a mechanism to retrieve performance monitoring counters from the database; wherein the database is configured to store performance monitoring counters from a plurality of network elements each including one of the plurality of device types. The database includes a plurality of records; wherein each of the plurality of records can include a set of common data and a set of generic data; wherein the set of common data includes a timestamp, a network element device type, and a network element identification; and wherein the set of common data is the same for each of the plurality of device types. The set of generic data includes a quantity sufficient to store a number of performance monitoring counters for each of the plurality of device types; wherein the performance monitoring counters for a specific device type of the plurality of device types are mapped to the set of generic data utilizing a database schema for mapping data responsive to the device type of the plurality of device types into a logical view; and wherein the database schema includes an extensible mark-up language file for each device type of the plurality of device types. Optionally, the plurality of device types includes a wavelength division multiplexing system, an optical switch, an Ethernet switch, and a SONET/SDH network element. A new device type is added to the plurality of device types in the database by defining a new extensible mark-up language file for the new device type.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention provides systems and methods for handling performance monitoring (PM) data in a database in a manner that supports different PM data sets from different network element (NE) device types in an integrated manner. The present invention defines a single database structure that can be utilized to store, handle, retrieve, etc. PM counters from multiple NEs including NEs of different types, e.g. SONET/SDH NE, DWDM NE, optical switch, Ethernet switch, etc. The single database enables an efficient mechanism to handle PM data in a uniform way across a network with different device types.

Figure 1:
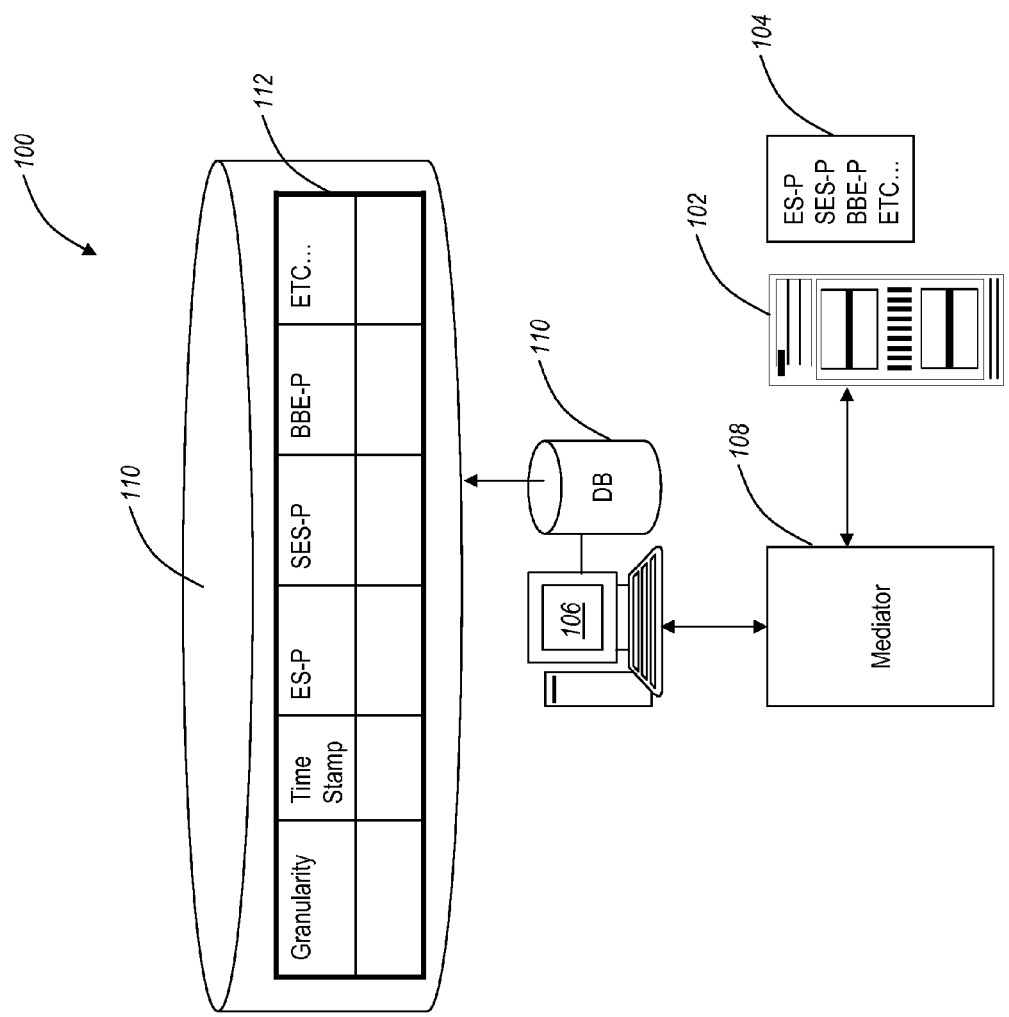
FIG. 1 is a diagram of a convention mechanism for handling historical PM data.
Figure 2:
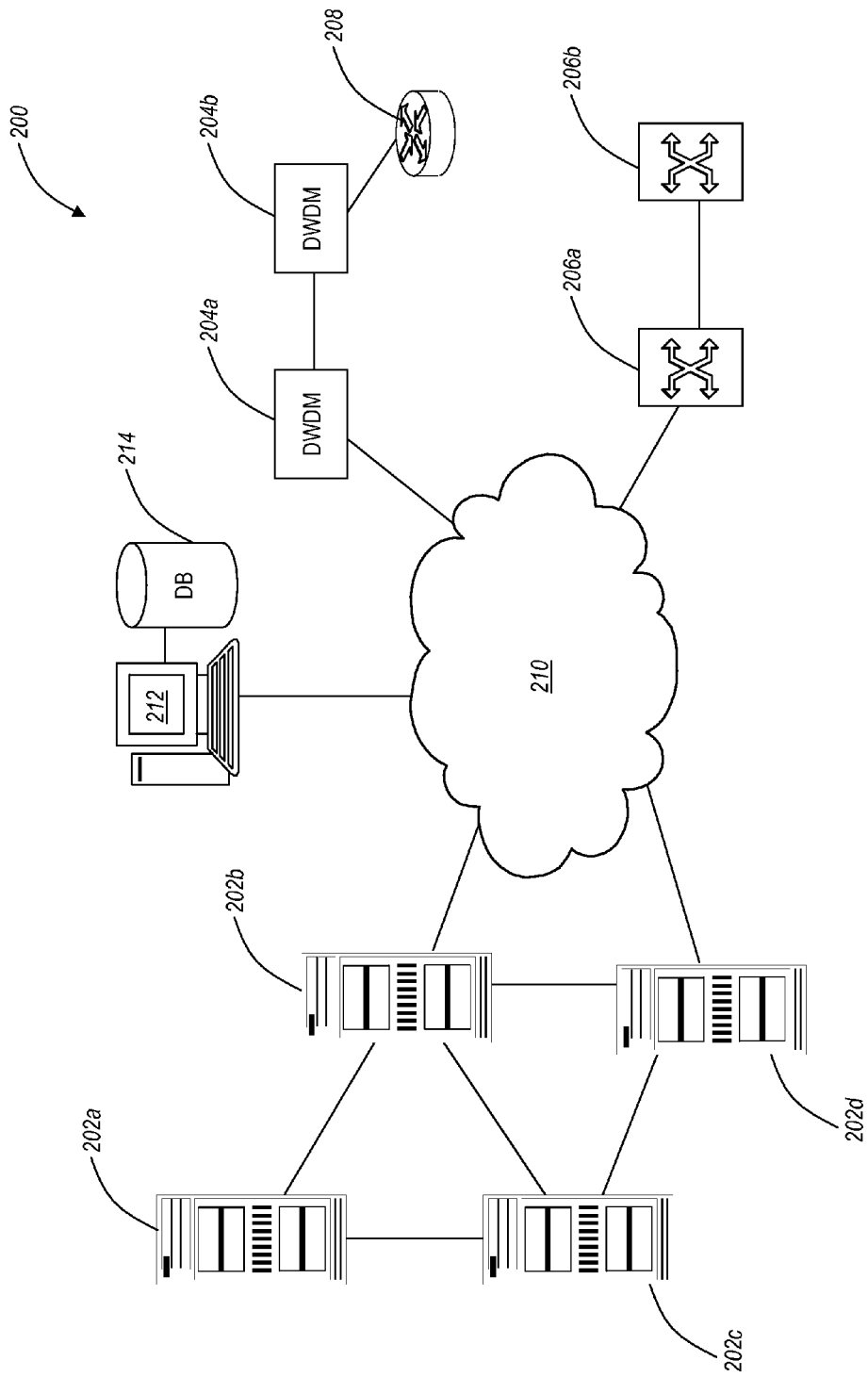
FIG. 2 is a network diagram of a communications network according to an exemplary embodiment of the present invention.

Referring to FIG. 2, a communications network 200 is illustrated according to an exemplary embodiment of the present invention. The network 200 includes a variety of different NE device types including optical switches 202a-d, DWDM NEs 204a-b, switches 206a-b, a router 208, and the like. These NEs 202a-d, 204a-b, 206a-b, 208 are interconnected through a network 210, such as a DWDM network or the like. Generally, the optical switches 202a-d are interconnected in a linear, ring, and/or mesh configuration, and support various SONET/SDH, OTN, and wavelength interconnections. Accordingly, the optical switches 202a-d can generate SONET/SDH and OTN PM counters.

The DWDM NEs 204a-b are illustrated in a point-to-point configuration, for example, and can support various wavelength-level interconnections. Generally, the DWDM NEs 204a-b can support OTN and optical layer PM counters. In this example, the DWDM NEs 204a-b connect to the router 208. For example, the router 208 can terminate an Ethernet connection from one of the switches 206a-b, from one of the optical switches 202a-d, etc. The switches 206a-b can support Ethernet, Asynchronous Transfer Mode (ATM), OTN, SONET/SDH, and the like, and can include various PM counters for Ethernet, ATM, and the like.

Collectively, each type of NE 202a-d, 204a-b, 206a-b, 208 generally includes a device or platform-specific EMS. The EMS can provide operations, administration, maintenance, and provisioning (OAM&P) functionality including alarming and performance monitoring based on the type of device. The NEs 202a-d, 204a-b, 206a-b, 208 may also connect to a NMS server 212 and a database (DB) 214. This connection can be direct from the NEs 202a-d, 204a-b, 206a-b, 208 or through the platform-specific EMSs, for example. The NMS server 212 can provide network-wide OAM&P functionality for a variety of different platforms, such as the NEs 202a-d, 204a-b, 206a-b, 208. Alternatively, each type of NE 202a-d, 204a-b, 206a-b, 208 can connect directly to the DB 214, such as through a server attached to the DB 214, solely for handling PM data.

The present invention provides systems and methods for handling historical performance monitoring (PM) data in a database in a manner that supports different PM data sets from different network element (NE) types in an integrated manner. Specifically, the NMS server 212 and the DB 214 are configured to handle (i.e., store, access, process, etc.) PM counters from each of the NEs 202a-d, 204a-b, 206a-b, 208, for example. This enables a network operator to view PM counters across the network between end users despite different NE device types.

Figure 3:
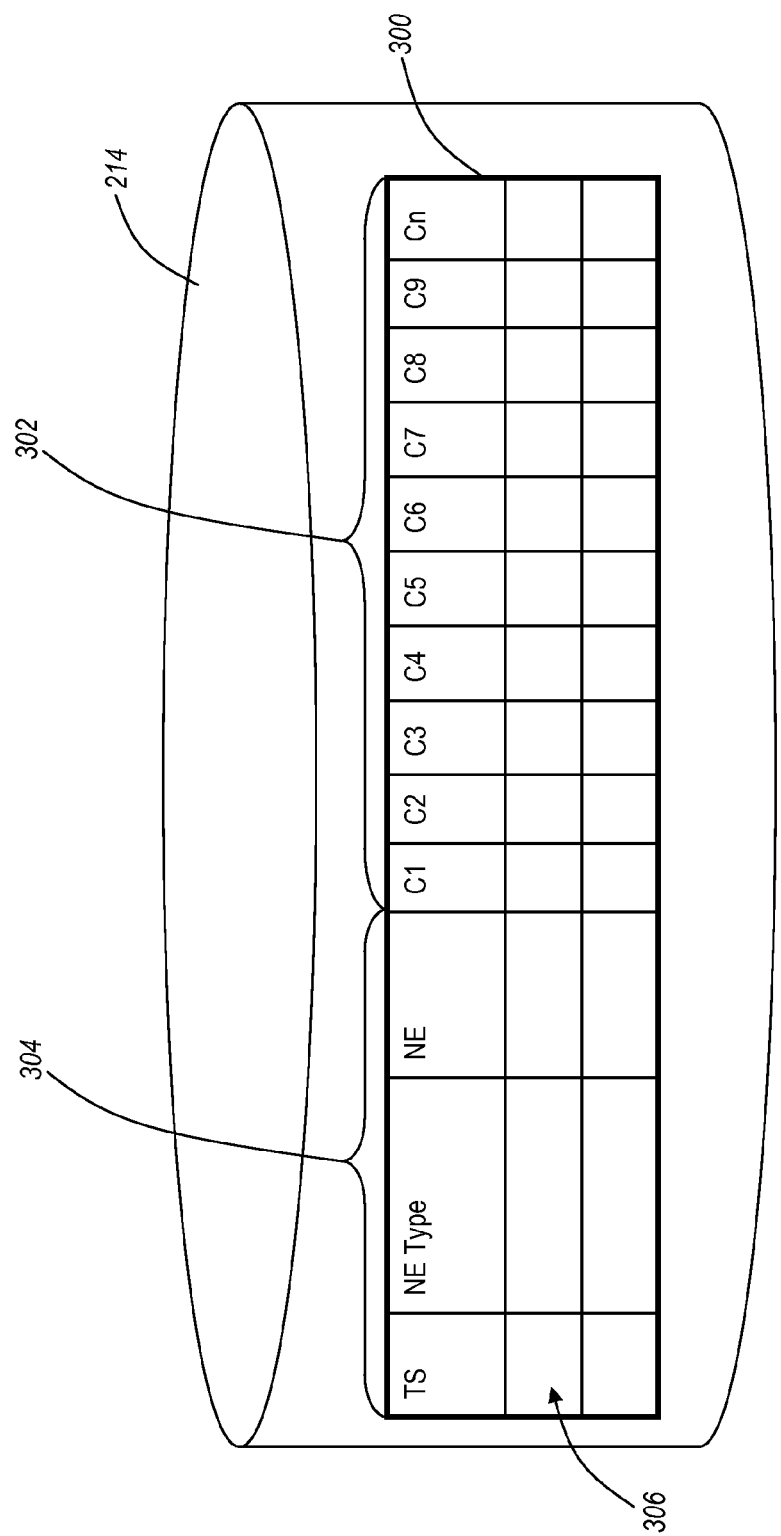
FIG. 3 is a logical view of a database for handling historical PM data from various different NE types according to an exemplary embodiment of the present invention.

Referring to FIG. 3, a logical view of the DB 214 is illustrated for handling historical PM data from various different NE types according to an exemplary embodiment of the present invention. The DB 214 includes a table 300 with multiple columns and rows to store historical PM counters from any NE type, such as the NEs 202a-d, 204a-b, 206a-b, 208. In an exemplary embodiment, the DB 214 includes generically modeled columns 302 and common columns 304.

Each row in the table 300 represents a different PM record 306. For example, NEs, such as the NEs 202a-d, 204a-b, 206a-b, 208, can generate a new set of PM data every 15 minutes, every minute, etc. Each row in the table 300 provides storage for one set of PM data, i.e. one record 306. Note, those of ordinary skill in the art will recognize that each new set of the PM data could be stored in the columns instead or rows, or the like as is known in the art.

The common columns 304 are utilized for each record 306 for information, such as, time stamp (TS), NE type, NE name, transport protocol (TP) name (e.g., SONET/SDH, OTN, Ethernet, etc.), granularity (e.g., 1 minute, 15 minutes, etc.), location, layer rate, zero suppress, and the like. The common columns 304 are used for each record 306 regardless of the device type. The generically modeled columns 302, labeled as C1, C2, ..., Cn, are not specifically tied to a PM counter value for specific device types or TP. There are n columns for the generically modeled columns 302 where n is defined as a max number of PM counter values required for support. For example, NE device type A could support 100 unique PM counters, NE device type B could support 200 unique counters, and NE device type C could support 500 unique counters, and a counter could include one specific type of PM value. In this example, there would be 500 total generically modeled columns 302, i.e. enough to support all the unique counters in NE type C with NE types A and B having unused columns.

The generically modeled columns 302 are defined based on the NE device type in the common columns 304, e.g. based on the TP name. For example, if the NE type is for NE type A, then the generically modeled columns 302 in the particular record 306 would utilize the column headings for the 100 unique counters associated with NE type A. In an exemplary embodiment of the present invention, the DB 214 is configured to support an optical switch NE, a metro/regional DWDM NE, a long haul DWDM NE, and an Ethernet Access NE. These associated NEs can fit into a DB 214 with up to 120 generically modeled columns 302 and eight common columns 304 for a total column count of 128 columns, for example.

Figure 4A:
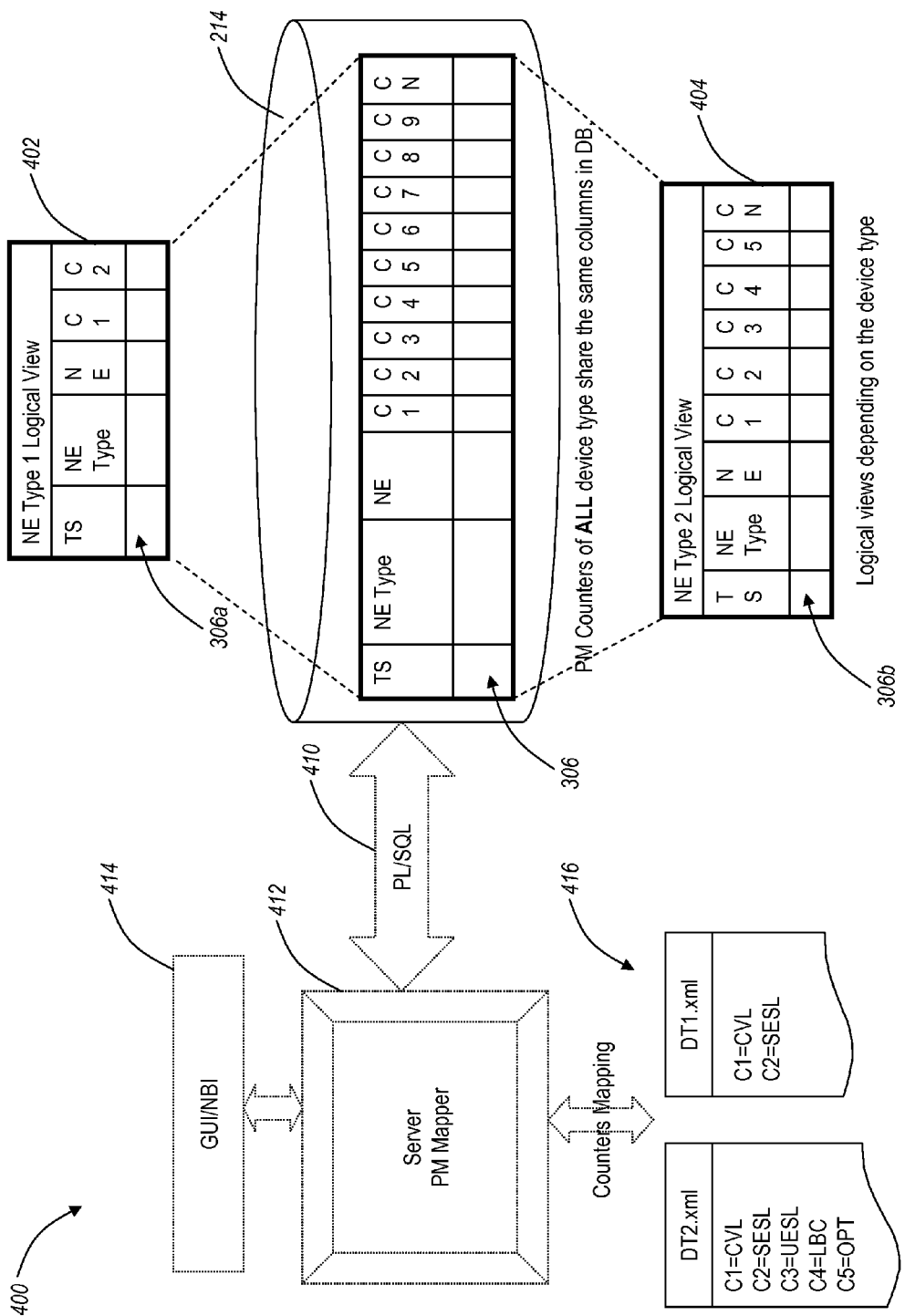
FIGS. 4A and 4B are diagram of database access models for utilizing the database in FIG. 3 to store historical PM data from two different NE types according to an exemplary embodiment of the present invention.
Figure 4B:
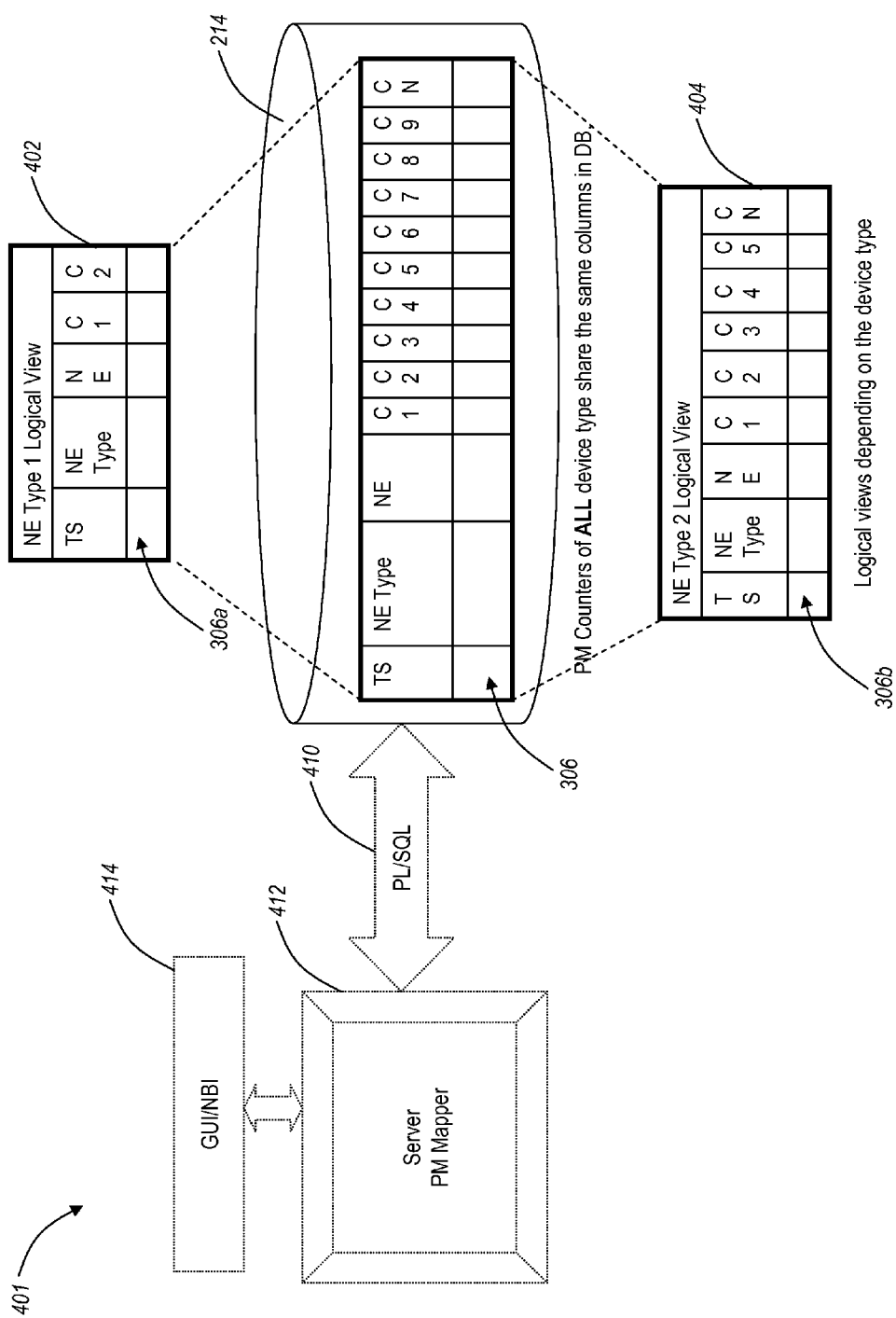

Referring to FIGS. 4A and 4B, DB access models 400, 401 are illustrated utilizing the DB 214 to store historical PM data from two different NE types according to an exemplary embodiment of the present invention. In these examples, two NE types, NE device Type 1 and NE device Type 2, are illustrated with corresponding records 306a, 306b in the DB 214. As described herein, PM counters (i.e., PM data values) of all device types share the same columns (or rows) in the DB 214, and corresponding logical views 402, 404 of records 306a, 306b depend on the NE device type.

The DB 214 can be stored in a data storage device, e.g. hard drive, network storage, etc., and the DB 214 can include a database, such as Oracle or the like. For example, Procedural Language/Structured Query Language (PL/SQL) 410 or the like can be utilized for accessing the DB 214. PL/SQL 410 is Oracle Corporation's procedural extension to the SQL database language.

A server/PM mapper 412 element is configured to interface to the DB 214, such as through PL/SQL 410. The server/PM mapper 412 can include an NMS, EMS, etc. The server/PM mapper 412 includes a graphical user interface/northbound interface (GUI/NBI) 414 for accessing the PM data in the DB 214. The GUI can be utilized for graphically displaying PM data responsive to a particular query from a user, and the NBI can be utilized to provide a Q3, SNMP, CORBA, TL-1, etc. interface to another management system.

The server/PM mapper 412 is also configured to provide mapping between the records 306a, 306b and the corresponding logical views 402, 404, i.e. to map the appropriate counter type to the columns in the records 306a, 306b. For example in the DB access model 400 (FIG. 4A), the counter to column mapping can be performed in an XML type (Extensible markup language type) and can be stored in the server as XML files 416 (e.g., DT1.xml, DT2.xml) in the server 412 (e.g., DT1, DT2 representing the different NE types of NE device Type 1 and NE device Type 2, respectively).

The DB Schema for PMs can have a deviceType column which is used to form logical views from the records 306, equivalent to having separate tables for different device type, and hence filtering/sorting/retrieval of the data from the DB 214. FIGS. 4A and 4B illustrate two exemplary different NE types, NE Type 1 and NE Type 2, with corresponding XML files 416, i.e. DT1.xml for NE device Type 1 and DT2.xml for NE device Type 2. For example, DT1 can have two counters CVL and SESL, and DT2 can have five counters CVL, SESL, UESL, LBC, OPT.

Accordingly, the respective XML files 416 can look something similar to:

| DT1.xml |
|---|
| C1 = CVL |
| C2 = SESL |

| DT2.xml |
|---|
| C1 = CVL |
| C2 = SESL |
| C3 = UESL |
| C4 = LBC |
| C5 = OPT |

So as described above, same column names have different linking in the DB 214 for the actual counters based on the device type. Accordingly, each column has a different association with a PM counter in the record 306 depending upon the device type (DT) mapping. The XML file 416 provides the mapping of the same for the device type. For example, there can be an XML file 416 for a DWDM network device type, an optical switch device type, an Ethernet switch device type, a SONET/SDH device type, and the like. Additionally, new device types can be easily added to the DB 214 through defining a new XML file 416. Advantageously, this enables a single DB 214 to provide historical PM handling for any new device type that is added to the network.

At startup of the server 412, the XML files 416 can be stored in the server 412 for fast mapping and reverse mapping for any queries coming in for read/write request in the DB 214. For example, a PM C-C (Counter to Column) mapper engine can start up as part of server 412 and is generic enough to understand the mapping arena for that specific device type and store it accordingly in the DB 214 for fast retrieval, for any request coming from GUI/NBI 414.

Alternatively, the DB access model 401 (FIG. 4B) can utilize schema of logical views respective to the device type to cater to the counter-to-counter mapping instead of the XML files 416. Here, the server 412 can include schema definitions for the logical views 402, 404 which define respective mapping for each device type. Note the DB access model 401 reduces all the overheads for mapping the XML files 416 and provides a faster approach in doing a read operation on the DB 214.

The DB Schema for PMs can have a deviceType column which is used to form logical views from the records 306, equivalent to having separate tables for different device type, and hence filtering/sorting/retrieval of the data from the DB 214. FIG. 4 illustrates two exemplary different NE types, NE Type 1 and NE Type 2, with corresponding logical view definitions i.e. logicalDT1.ddl for NE device Type 1 and logicalDT2.schema for NE device Type 2. For example, DT1 can have two counters CVL and SESL, and DT2 can have five counters CVL, SESL, UESL, LBC, OPT.

Accordingly, the respective schema files can look something similar to:

---
Sample View Definition for logicalDT1.ddl:

CREATE OR REPLACE VIEW PM_DWDM
(TIME_STAMP, NE_DEVICE_TYPE, NE_NAME, CVL, SESL)
AS (SELECT NE_DEVICE_TYPE, NE_NAME, TIME_STAMP,
C1, C2 FROM PM_TABLE);

---

Conventionally, every NMS is linked with a DB and PM collection is always a bottle neck for the NMS as it caters to various types of NE's and the collection typically occurs every 15 mins by default. Advantageously, the present invention provides a generic approach in designing the DB 214 without defining counters. Accordingly, any device type can be incorporated very easily with a plug-n-play mechanism. Also, the present invention provides a scalable approach if the network increases with wide range of devices to support PM handling. Additionally, the present invention can be applied to any other type of table which needs distinction based on the table, is easily manageable, and can support logical views to increase the retrieval/filtering/sorting mechanism (i.e., customizable consolidated reports can be generated based on the logical views). Further, archiving and purging of the data in the DB 214 is very easy if the data is kept in a single table rather than in different tables.

Figure 5:
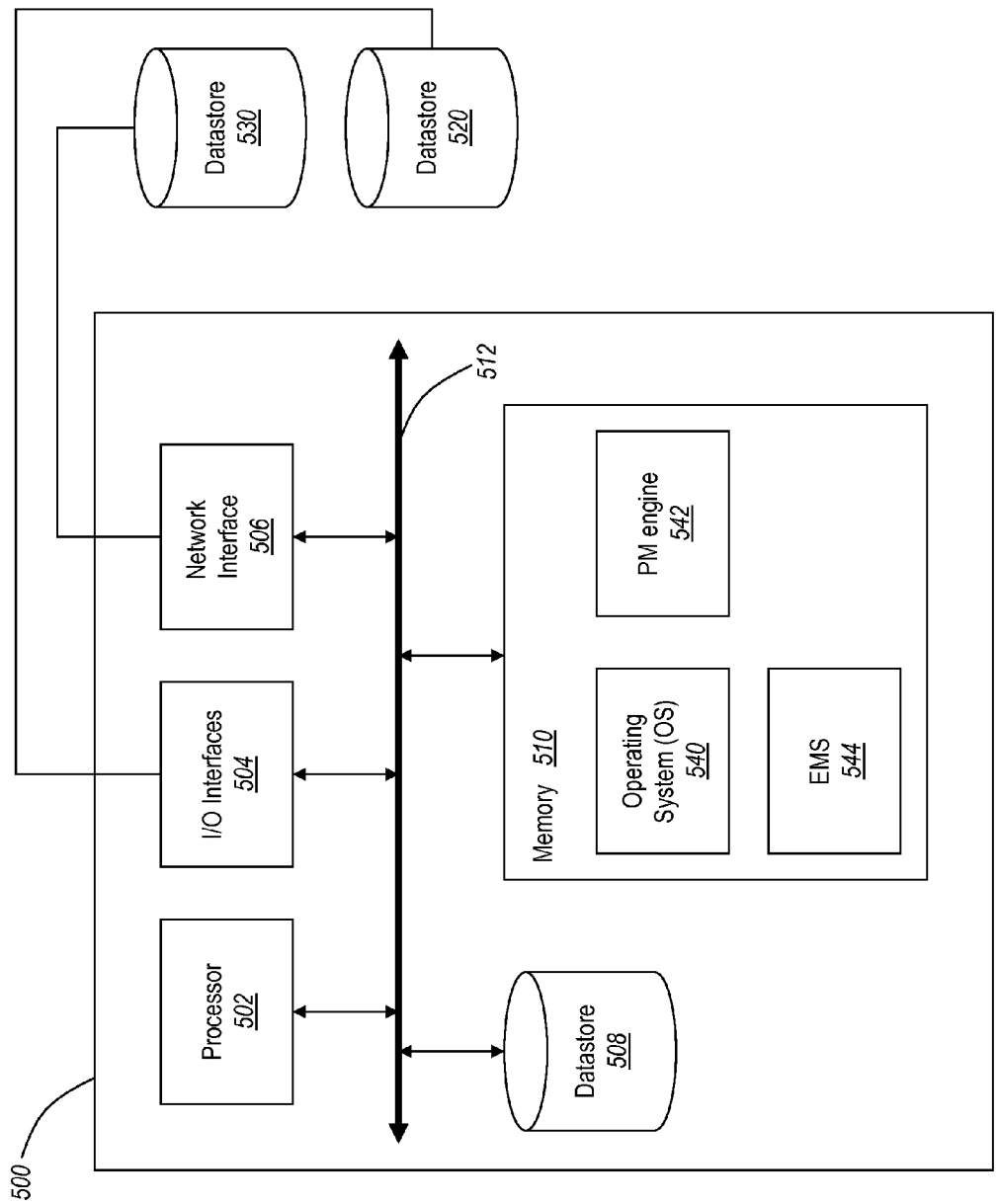
FIG. 5 is a block diagram of a server for handling historical PM data from various different NE types according to an exemplary embodiment of the present invention.

Referring to FIG. 5, a block diagram illustrates a server 500 for handling historical PM data from various different NE types, according to an exemplary embodiment of the present invention. The server 500 can be a digital computer that, in terms of hardware architecture, generally includes a processor 502, input/output (I/O) interfaces 504, network interfaces 506, memory 510, and a data store 508. The components (502, 504, 506, 508, and 510) are communicatively coupled via a local interface 512. The local interface 512 can be, for example but not limited to, one or more buses or other wired or wireless connections, as is known in the art. The local interface 512 can have additional elements, which are omitted for simplicity, such as controllers, buffers (caches), drivers, repeaters, and receivers, among many others, to enable communications. Further, the local interface 512 can include address, control, and/or data connections to enable appropriate communications among the aforementioned components.

The processor 502 is a hardware device for executing software instructions. The processor 502 can be any custom made or commercially available processor, a central processing unit (CPU), an auxiliary processor among several processors associated with the server 500, a semiconductor-based microprocessor (in the form of a microchip or chip set), or generally any device for executing software instructions. When the server 500 is in operation, the processor 502 is configured to execute software stored within the memory 510, to communicate data to and from the memory 510, and to generally control operations of the server 500 pursuant to the software instructions.

The I/O interfaces 504 can be used to receive user input from and/or for providing system output to one or more devices or components. User input can be provided via, for example, a keyboard and/or a mouse. System output can be provided via a display device and a printer (not shown). I/O interfaces 504 can include, for example, a serial port, a parallel port, a small computer system interface (SCSI), an infrared (IR) interface, a radio frequency (RF) interface, and/or a universal serial bus (USB) interface.

The network interfaces 506 can be used to enable the server 500 to communicate on a network. For example, the server 500 can utilize the network interfaces 506 to communicate to NEs, other EMS/NMS systems, and the like. Each NE can include a network interface to communicate to the server 500 for OAM&P, such as providing PM data. The network interfaces 506 can include, for example, an Ethernet card (e.g., 10 BaseT, Fast Ethernet, Gigabit Ethernet) or a wireless local area network (WLAN) card (e.g., 802.11a/b/g/n). The network interfaces 506 can include address, control, and/or data connections to enable appropriate communications on the network.

A data store 508 can be used to store data, such as PM information received from NEs. The data store 508 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 508 can incorporate electronic, magnetic, optical, and/or other types of storage media. In one example, the data store 508 can be located internal to the server 500 such as, for example, an internal hard drive connected to the local interface 512 in the server 500. Additionally in another embodiment, the data store can be located external to the server 500 such as, for example, an external hard drive (e.g., data store 520) connected to the I/O interfaces 504 (e.g., SCSI or USB connection). Finally in a third embodiment, the data store may be connected to the server 500 through a network, such as, for example, a network attached file server (e.g., data store 530). The DB 214 can be stored in one of more of the data stores 508, 520, 530. Additionally, the DB 214 can be stored redundantly in one or more of the data stores 508, 520, 530.

The memory 510 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 510 may incorporate electronic, magnetic, optical, and/or other types of storage media. Note that the memory 510 can have a distributed architecture, where various components are situated remotely from one another, but can be accessed by the processor 502.

The software in memory 510 can include one or more software programs, each of which includes an ordered listing of executable instructions for implementing logical functions. In the example of FIG. 5, the software in the memory system 510 includes a suitable operating system (O/S) 540, a PM engine 542, and an EMS program 544. The operating system 540 essentially controls the execution of other computer programs, such as the PM engine 542 and the EMS program 544, and provides scheduling, input-output control, file and data management, memory management, and communication control and related services. The operating system 540 can be any of Windows NT, Windows 2000, Windows XP, Windows Vista (all available from Microsoft, Corp. of Redmond, Wash.), Solaris (available from Sun Microsystems, Inc. of Palo Alto, Calif.), or LINUX (or another UNIX variant) (available from Red Hat of Raleigh, N.C.).

The server 500 can operate as an EMS, NMS, or the like operable to manage NEs in the network. For example, the server 500 can include the EMS program 544 loaded in the memory 510. The EMS program 544 can provide OAM&P access to the NEs. The server 500 can include multiple EMS programs 544 to allow OAM&P access to multiple NE types.

In an exemplary embodiment of the present invention, the PM engine 542 is included on the server 500. The PM engine 542 is a software program configured to handle PM counter data in the DB 214, including storing PM counters from a plurality of different device types over time, mapping the PM counters to appropriate columns based on a mapping scheme, and retrieval of PM counters in the DB 214 responsive to various queries. Further, the PM engine 542 can support the addition of new device types, such as through the addition of a new mapping file. The PM engine 242 can also be configured to perform DB 214 maintenance allowing purging of records, repairing of records, and the like. The PM engine 542 includes the functionality of the PM mapper described in the server 412 of FIGS. 4A and 4B.

Figures 6A, 6B:
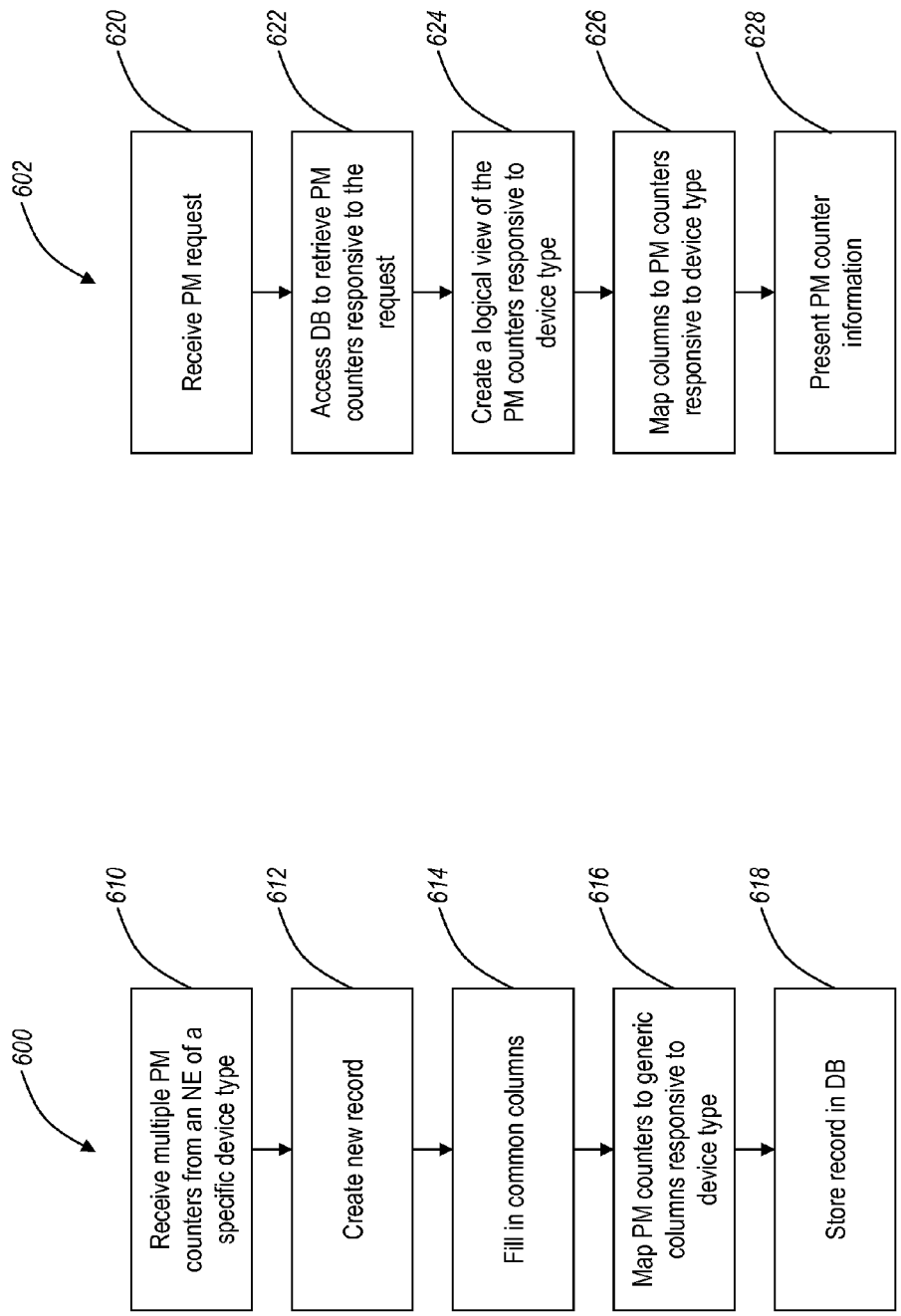
FIGS. 6A and 6B are flowcharts for storage (FIG. 6A) and retrieval (FIG. 6B) of historical PM data from a database according to an exemplary embodiment of the present invention.

Referring to FIGS. 6A and 6B, flowcharts illustrate storage 600 (FIG. 6A) and retrieval 602 (FIG. 6B) of historical PM data from a DB 214 according to an exemplary embodiment of the present invention. For storage 600, multiple PM counters are received from an NE of a specific device type (step 610). For example, the device type can include a DWDM NE, optical switch NE, etc., and the set of PM counters is determined by the device type, i.e. a different set of PM counters for a DWDM NE then an optical switch NE. A new record is created (step 612). As described herein, each record for storing PM counters includes a set of common columns and a set of generic columns.

The common columns are filled in (step 614). This can include noting the device type, the time stamp, etc. from the initial receipt of the multiple PM counters. The PM counters are mapped to the generic columns responsive to the device type (step 616). Here, a mapping process logically maps the PM counters into columns, such as using an XML mapping file (FIG. 4). The generic columns are generically labeled allowing multiple NE device types to use the same DB for PM counter storage. The mapping step provides a mechanism to determine where each of the multiple PM counters should be placed in the record. Finally, the completed record is stored in the DB (step 618).

For retrieval 602, a request is received for PM data (step 620). For example, a request could be from a management system or from a user, and the request could include a specific PM record or a set of records in the DB. The DB is accessed to retrieve PM counters responsive to the request (step 622). A logical view is created of the PM counters responsive to the device type (step 624). The logical view is created using the mapping process to determine the associated PM counter for each column based on the device type specific mapping. Finally, the PM counter information is presented (step 628). Here, this can include GUI-based presentation in a management system or the like. For example, the PM counter information can be presented in a table, graph, etc. for one NE or for a variety of NEs of different device types.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A method for handling historical performance monitoring data, comprising:
receiving a set of performance monitoring counters from a network element comprising a network element device type of a plurality of network element device types comprising one of a plurality of protocols comprising SONET/SDH, OTN, and Ethernet;
creating a new record in a performance monitoring database, wherein records in the performance monitoring database store the set of performance monitoring counters for SONET/SDH, OTN, and Ethernet, and wherein at least one record in the performance monitoring database is for SONET/SDH, at least one record is for OTN, and at least one record is for Ethernet;
filling in common columns in the new record;
mapping the set of performance monitoring counters to generic columns in the performance monitoring database responsive to the device type such that the same generic column has different linking in the performance monitoring database for different sets of performance monitoring counters based on the device type, wherein the set of performance monitoring counters is distinct for each of the plurality of protocols; and storing the new record;

wherein the performance monitoring database is configured to store performance monitoring data for each of the plurality of protocols in an integrated manner in a single database structure, and wherein performance monitoring data for SONET/SDH, OTN, and Ethernet is stored in the same generic columns of the database structure and handled and retrieved individually based on the mapping in accordance with device type, wherein the generic columns comprise a quantity sufficient to store a number of performance monitoring counters for each of the plurality of network element device types, wherein the performance monitoring counters for a specific device type are mapped to the generic columns utilizing a database schema for mapping data responsive to the specific device type of the plurality of network element device types into a logical view, and wherein the database schema comprises one of schema definitions for logical views which define respective mappings for each device type of the plurality of network element device types and an extensible mark-up language file for each device type of the plurality of network element device types.

2. The method of claim 1, further comprising:

receiving a request for performance monitoring information;

accessing the performance monitoring database to retrieve a record in the performance monitoring database responsive to the request;

creating a logical view from the record responsive a device type of the record;

mapping columns in the record to performance monitoring counters; and presenting the performance monitoring counters.

3. The method of claim 1, wherein the new record comprises a set of common columns and a set of generic columns comprising data specific to one of the plurality of protocols.

4. The method of claim 3, wherein the common columns comprise a timestamp, a network element device type, and a network element identification; and wherein the set of common columns is the same for each of the plurality of device types.

5. The method of claim 1, wherein the plurality of device types comprise a wavelength division multiplexing system, an optical switch, an Ethernet switch, and a SONET/SDH network element.

6. A database system for handling historical performance monitoring data, comprising:

memory comprising a data store; and a performance monitoring database stored in the data store, wherein the performance monitoring database comprises a plurality of records, wherein records in the performance monitoring database store the set of performance monitoring counters for SONET/SDH, OTN, and Ethernet, wherein at least one record in the performance monitoring database is for SONET/SDH, at least one record is for OTN, and at least one record is for Ethernet, and wherein each of the plurality of records comprises:

a set of common columns; and a set of generic columns, wherein each column in the set of generic columns is defined responsive to a network element device type of a plurality of network element device types comprising one of a plurality of protocols comprising SONET/SDH, OTN, and Ethernet;

wherein performance monitoring counters for the plurality of device types are stored in the performance monitoring database, wherein each of the set of generic columns is based on a protocol of the plurality of protocols, and wherein the same generic column has different linking in the performance monitoring database for different performance monitoring counters based on the network element device type; and wherein the performance monitoring database is configured to store performance monitoring data for each of the plurality of protocols in an integrated manner in a single database structure, and wherein performance monitoring data for SONET/SDH, OTN, and Ethernet is stored in the same generic columns of the database structure and handled and retrieved individually based on the mapping in accordance with network element device type, wherein the set of generic columns comprises a quantity sufficient to store a number of performance monitoring counters for each of the plurality of network element device types;

wherein the performance monitoring counters for a specific device type are mapped to the set of generic columns utilizing a database schema for mapping data responsive to the specific device type of the plurality of network element device types into a logical view; and wherein the database schema comprises one of schema definitions for logical views which define respective mappings for each device type of the plurality of network element device types and an extensible mark-up language file for each device type of the plurality of network element device types.

7. The database of claim 6, wherein the set of common columns comprise a timestamp, a network element device type, and a network element identification; and wherein the set of common columns is the same for each of the plurality of device types.

8. The database of claim 6, wherein the plurality of device types comprise a wavelength division multiplexing system, an optical switch, an Ethernet switch, and a SONET/SDH network element.

9. A management system, comprising:

a data store;

memory;

a network interface configured to receive performance monitoring counters from a plurality of devices, wherein each of the plurality of devices comprises one of a plurality of device types comprising one of a plurality of protocols comprising SONET/SDH, OTN, and Ethernet;

input/output interfaces;

a processor, wherein each of the processor, the data store, the memory, the network interface, and the input/output interfaces are communicatively coupled;

a mechanism to map received performance monitoring counters to a performance monitoring database in the data store responsive to a network element device type of the plurality of network element device types, wherein records in the performance monitoring database store the performance monitoring counters for SONET/SDH, OTN, and Ethernet, and wherein at least one record in the performance monitoring database is for SONET/SDH, at least one record is for OTN, and at least one record is for Ethernet, and wherein a same generic column has different linking in the performance monitoring database for different performance monitoring counters based on the network element device type; and a mechanism to retrieve performance monitoring counters from the performance monitoring database, wherein the performance monitoring counters are distinct for each of the plurality of protocol;

wherein the performance monitoring database is configured to store performance monitoring counters from a plurality of network elements each comprising one of the plurality of device types; and wherein the database is configured to store performance monitoring data for each of the plurality of protocols in an integrated manner in a single database structure, and wherein performance monitoring data for SONET/SDH, OTN, and Ethernet is stored in the same generic columns of the database structure and handled and retrieved individually based on the mapping in accordance with network element device type, wherein the generic columns comprise a quantity sufficient to store a number of performance monitoring counters for each of the plurality of network element device types;

wherein the performance monitoring counters for a specific device type of the plurality of device types are mapped to the set of generic data utilizing a database schema for mapping data responsive to the device type of the plurality of network element device types into a logical view; and wherein the database schema comprises one of schema definitions for logical views which define respective mappings for each device type of the plurality of network element device types and an extensible mark-up language file for each device type of the plurality of network element device types.

10. The management system of claim 9, wherein the performance monitoring database comprises a plurality of records;

wherein each of the plurality of records comprises a set of common data and a set of generic data;

wherein the set of common data comprises a timestamp, a network element device type, and a network element identification; and wherein the set of common data is the same for each of the plurality of device types.

11. The management system of claim 9, wherein the plurality of device types comprise a wavelength division multiplexing system, an optical switch, an Ethernet switch, and a SONET/SDH network element.

* * * * *